United States Patent
Haghighi

(10) Patent No.: US 7,496,736 B2
(45) Date of Patent: Feb. 24, 2009

(54) METHOD OF EFFICIENT DIGITAL PROCESSING OF MULTI-DIMENSIONAL DATA

(76) Inventor: Siamack Haghighi, 15 Cala D'Or, Laguna Niguel, CA (US) 92677

( * ) Notice: Subject to any disclaimer, the term of this patent is extended or adjusted under 35 U.S.C. 154(b) by 342 days.

(21) Appl. No.: 11/196,868

(22) Filed: Aug. 3, 2005

(65) Prior Publication Data

US 2006/0044316 A1 Mar. 2, 2006

Related U.S. Application Data

(60) Provisional application No. 60/573,904, filed on Aug. 27, 2004.

(51) Int. Cl.
*G06F 7/38* (2006.01)
*G06F 9/00* (2006.01)
*G06F 9/44* (2006.01)
*G06F 15/00* (2006.01)

(52) U.S. Cl. ....................................................... 712/221
(58) Field of Classification Search .................. 712/221
See application file for complete search history.

(56) References Cited

U.S. PATENT DOCUMENTS

| | | | | |
|---|---|---|---|---|
| 5,539,664 A | * | 7/1996 | Haghighi et al. | 345/557 |
| 5,786,856 A | * | 7/1998 | Hall et al. | 348/403.1 |
| 6,028,638 A | * | 2/2000 | Kim | 375/240.16 |
| 6,128,047 A | * | 10/2000 | Chang et al. | 348/699 |
| 6,130,912 A | * | 10/2000 | Chang et al. | 375/240.16 |
| 6,697,528 B1 | * | 2/2004 | Numata | 382/233 |
| 6,823,015 B2 | * | 11/2004 | Hall et al. | 375/240.24 |
| 2006/0044316 A1 | * | 3/2006 | Haghighi | 345/544 |
| 2006/0110066 A1 | * | 5/2006 | Tagawa et al. | 382/276 |
| 2006/0165175 A1 | * | 7/2006 | Yin | 375/240.16 |

* cited by examiner

*Primary Examiner*—Eddie P Chan
*Assistant Examiner*—Corey S Faherty
(74) *Attorney, Agent, or Firm*—O'Melveny & Myers LLP

(57) ABSTRACT

An innovative approach for constructing optimum, high-performance, efficient DSP systems may include a system organization to match compute execution and data availability rate and to organize DSP operations as loop iterations such that there is maximal reuse of data between multiple consecutive iterations. Independent set up and preparation of data before it is required through suitable mechanisms such as data pre-fetching may be used. This technique may be useful and important for devices that require cost-effective, high-performance, power consumption efficient VLSI IC.

6 Claims, 9 Drawing Sheets

METHOD OF EFFICIENT DIGITAL PROCESSING OF MULTI-DIMENSIONAL DATA

RELATED APPLICATIONS

The present application claims priority from currently pending U.S. provisional patent application 60/573,904 filed Aug. 27, 2004.

FIELD OF THE INVENTIONS

The present invention generally relates to digital signal processing techniques and more specifically to high-performance, efficient digital signal processing system organization and operation employing innovative application organization suitable for Very Large Scale Integration (VLSI) Integrated Circuit (IC) implementation.

BACKGROUND OF THE INVENTIONS

High quality, multimedia and networking consumer electronics devices require efficient high-performance Digital Signal Processing (DSP) capabilities. Example devices are high-resolution displays, networked video camera recorders, digital satellite and cable TV receivers, personal video recorders, cell phones, video game boxes and high-speed Wireless Local Area Network (WLAN) devices. These devices employ variety of communication, video, 3-D graphics DSP applications and algorithms and data elements in multiple data sets. Innovative organization and structuring of the processing tasks is required to deliver efficient, high-performance, cost-competitive solutions. This is especially important in VLSI IC implementations due to potential cost, power consumption and performance implications.

Some of the commonly used consumer electronic device applications and capabilities are video encode, decode, high speed wireless data transfer, video and image display processing. Each application may employ one or more DSP algorithms such as motion estimation, compensation, stereo disparity match, Fast Fourier Transform, cross correlation, filtering of time sampled data sequences, video, and image pre and post filtering. These applications can be structured hierarchically. At the lowest level of the hierarchy, one or more DSP algorithms are repeatedly applied to groups of data elements.

High performance DSP systems generally consist of one or more DSP ICs suitably connected to other devices. The currently available DSP ICs range from fixed function hard-wired to software programmable processors. In hard-wired IC and system implementations, internal or external memory elements are used to store and retrieve entire data sets used or created by DSP operations. Innovative mechanisms that result in efficient data access and reuse would thus be beneficial to such implementations. In the absence of such innovations, high-quality devices require high-speed memory elements for repeated access and retrieval of data elements resulting in higher-cost, lower power consumption efficiency and shorter battery life in portable devices.

Alternatively, software programmable processors containing internal or external special purpose elements, such as data cache, can benefit from innovative data reuse strategies. Many high-quality, high-performance systems require DSP capability beyond the ability of current single processor systems, thus necessitating the need for multiple processors. Therefore, optimal data reuse strategies that are scalable to various numbers of processing units are needed.

It can thus be appreciated that a need exists for scalable, high-performance mechanisms suitable for efficient VLSI implementation and capable of meeting the processing demands of high-quality consumer electronics DSP systems.

SUMMARY

The techniques presented here describe high-performance, efficient system organization mechanisms based on special ordering and processing of the computational tasks to maximize data reuse between successive computational steps. The technique may be suitable for VLSI implementation and operation delivering balanced data processing, delivery and access capabilities.

An innovative approach for constructing optimum, high-performance, efficient DSP systems may include a system organization to match compute execution and data availability rate and to organize DSP operations as loop iterations such that there is maximal reuse of data between multiple consecutive iterations. Independent set up and preparation of data before it is required through suitable mechanisms such as data pre-fetching may be used. This technique may be useful and important for devices that require cost-effective, high-performance, power consumption efficient VLSI IC.

In a first aspect, the disclosed technique includes one or more customized data memories and multiple processing elements suitably communicating via a high performance interconnect. The organization and access mechanism may be utilized to meet a variety of implementation requirements such as performance, size, throughput, power and cost.

In another aspect, the disclosed technique may be suitable for high-performance motion estimation, used by many video-encoding applications.

In still another aspect, the present technique may enable high performance DSP by organizing each image of a series of images to be processed into a two dimensional array of picture elements. The array of picture elements may be subdivided to form a two dimensional array of non-overlapping macroblocks. Each macroblock is an array of r rows by c columns. Processing of the picture element data within the array of macroblocks may proceed by selecting a first macroblock and performing any suitable data processing on the contents of the macroblock.

A technique for processing n-dimensional data may include the steps of: determining a number of dimensions n for data to be processed, and subdividing the data to be processed into elements, and grouping data elements into n-dimensional blocks having n types of subsets, each subset type having one or more data element groups in each n-dimensional block, and selecting an n-dimensional block for processing, and loading data from the selected block into a memory array, and processing the loaded data, and saving the processing results, and moving the loaded data in one of n directions and loading a corresponding data element group from an adjacent n-dimensional block, and processing the loaded data, and saving the processing results, and repeating the moving, processing and saving steps until the data to be processed is processed.

DETAILED DESCRIPTION OF THE INVENTIONS

Figure 1:
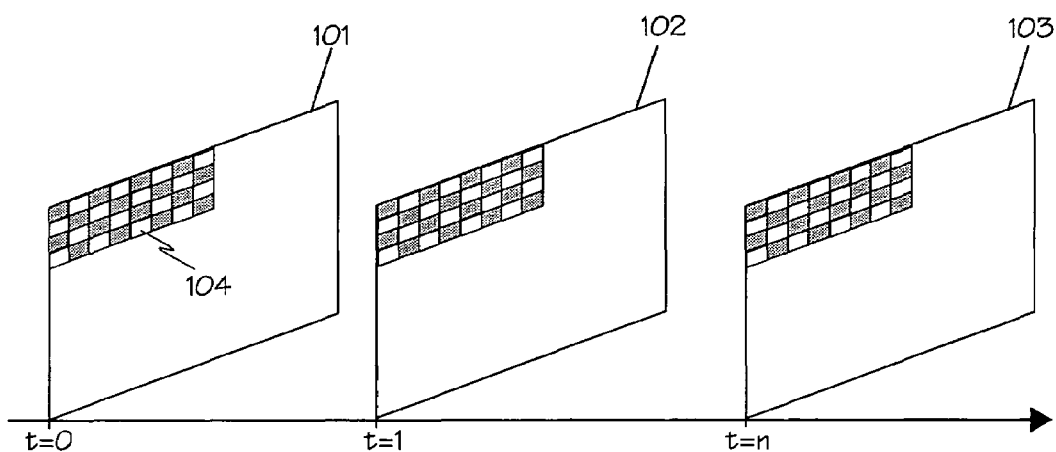
FIG. 1 is an example sequence of video frames consisting of two-dimensional (2-D) spatial arrangement of picture elements or pixels.

Many algorithms frequently used in DSP applications involve mathematical operations on an n-dimensional signal $R(x_1 \ldots x_n)$. This may be generally described as:

$$O(u_1 \ldots u_n) = \sum_{x_n=-N}^{+N} \ldots \sum_{x_1=-M}^{+M} f(R(x_1 \ldots x_n) \circ S(x_1 \ldots x_n, u_1 \ldots u_n))$$

where $x_1 \ldots x_n$ are the vector indices, $S(.)$ is another appropriate signal or constant, $\circ$ is a suitable mathematical operation, $O(.)$ is a desired output signal and $f(.)$ is a mathematical function. Example algorithms and applications that may be suitably applied are:

Video coding Motion estimation using sum of absolute value of pixel-wise difference as the distortion metric: n=2, $S(.)$, $R(.)$ represent search and reference picture elements, the mathematical operation $\circ$ is subtraction, $f(.)$ is the absolute value function, M and N represent pixel group macroblock horizontal and vertical sizes, and $u_1 \ldots u_n$ are the motion vector horizontal, vertical values. Other function and mathematical operations can also be used to provide different metrics such as sum of the square of pixel wise differences.

Video decode motion compensation: n=2, $S(.)$ is the stored or reconstructed frame pixel array elements, $R(.)$ is the array of constants with value 1 at search frame locations $x_1 \ldots x_n$ corresponding to motion vector match and 0 otherwise, M and N represent pixel group macroblock horizontal and vertical sizes, $u_1 \ldots u_n$ are the motion vector horizontal, vertical values, $\circ$ is scalar multiplication or selection operation, and $f(.)$ is a linear function.

Image filtering: n=2, $S(.)$ is the source image data, $R(.)$ is the set of filter coefficients, $\circ$ is the multiply operation, M, N are horizontal and vertical filtering region size, $u_1 \ldots u_n$ is the filtered signal index, $x_1 \ldots x_n$ is the filter support range, and $f(.)$ is a linear function.

2-D Data transform: n=2, $R(.)$ is a complex signal, $S(.)$ is the transform basis function, $\circ$ is complex multiply, M, N are horizontal and vertical transform size, $u_1 \ldots u_n$ is the transform index, $x_1 \ldots x_n$ is the signal index, and $f(.)$ is a linear function. Example transformations are direct and inverse Discrete Fourier Transform (DFT) and Cosine Transform (DCT).

1-D correlation: n=1, $S(.)$ and $R(.)$ are complex signal sequences, $\circ$ is complex conjugate multiply operation, etc.

An optimum high-performance, efficient DSP system can be organized to match the compute execution rate and loading or storing of the required data. The data includes input signals $S(.)$, $R(.)$, $O(.)$ and potentially additional intermediate data values.

In the following section video compression motion estimation applications are presented as examples, the present technique may be equally applicable to other DSP algorithms that process multidimensional data vectors in multiple data sets with significant data reuse opportunity between successive computational steps or iterations, or any other suitable applications.

FIG. 1 depicts a time sequence of 2-D images such as video frames 101-103. Each video frame consists of many smaller picture elements or pixels. Each pixel such as pixel 104 may be represented by one or more vectors of values representing for example, luminance and color. Each luminance and color component may be represented as a multi-bit (e.g. 8 bit) value. Variations of this representation such as using few color components to represent several luminance values are also possible. One special organization and ordering of the pixels is into n spatially adjacent rows, each consisting of m adjacent pixel elements. Such grouping is a basic 2-D representation used by variety of multimedia digital signal processing algorithms. For example, a 16×16 pixel element data grouping may be called a Macroblock. Any other suitable number and dimension of pixels may also be used. A macroblock grouping is typically applied to one characteristic of interest, e.g. pixel luminance components, color, or any other suitable characteristic.

Figure 2:
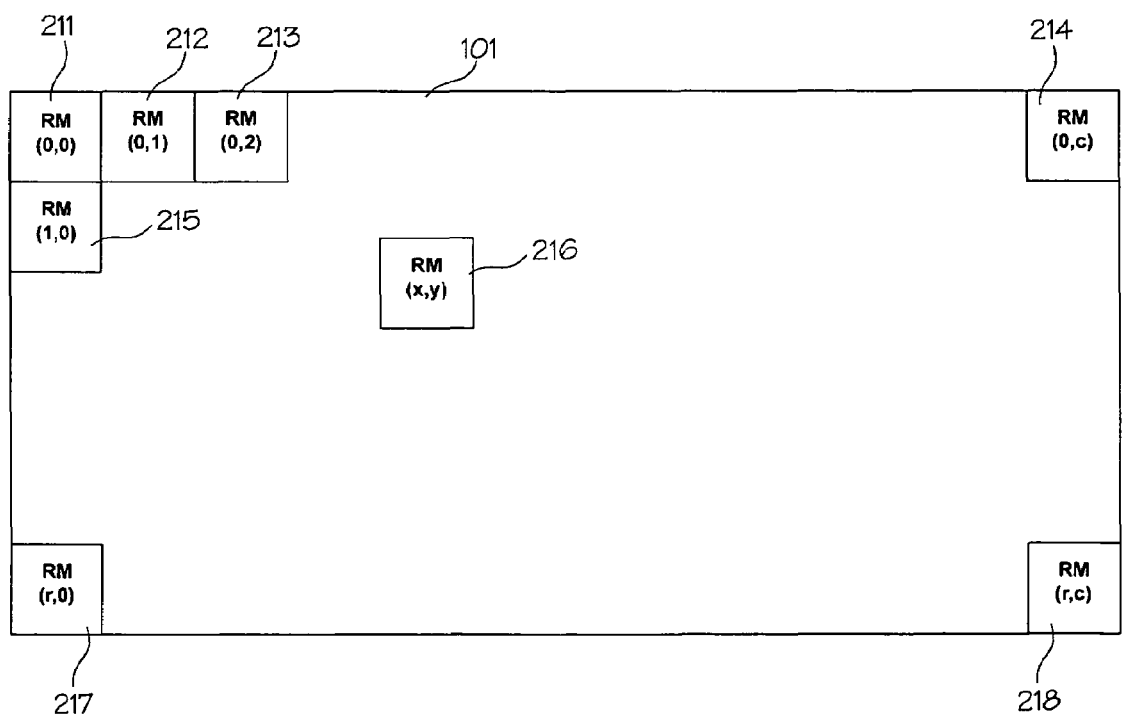
FIG. 2 is an example partitioning and ordering of a reference video frame to 2-D grouping of pixels into macroblocks.

Referring now to FIG. 2, a video frame 101 may be organized as non-overlapping macroblocks, such as macroblocks 211-216. Macroblocks in a video frame may be organized as a two dimensional array with c macroblocks per row and r rows per frame. The macroblocks in frame 101 are designated as reference macroblock (RM).

Figure 3:
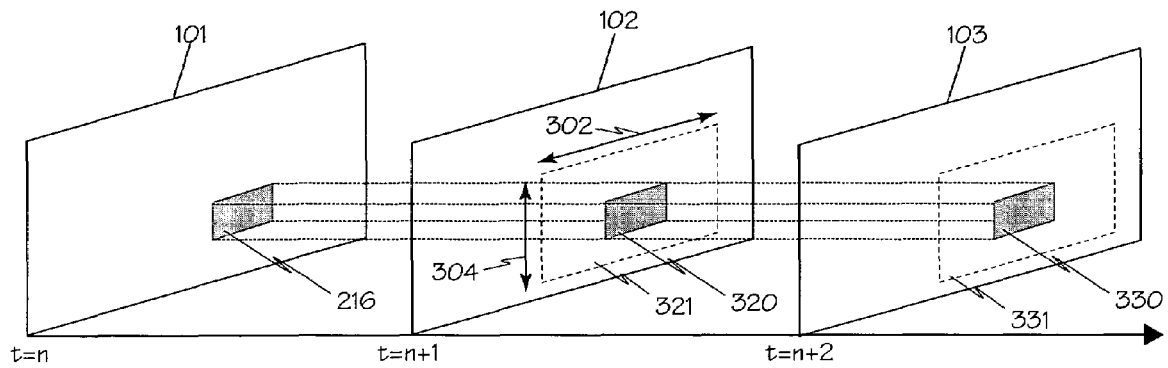
FIG. 3 is an example reference, search frame, macroblock, and the corresponding search region in other video frames. This figure also illustrates horizontal and vertical search regions for a reference macroblock.

Referring now to FIG. 3, in digital video compression, Motion Estimation (ME) is used to identify similarities among macroblocks in video frames. Instead of transmitting or storing macroblock pixel information, a motion vector representing the most similar macroblock can be used, typically annotated as horizontal and vertical displacement vector (horizontal relative offset, vertical relative offset). The ME operation involves comparing macroblock group of pixel values against one or several video frame pixels. Macroblock 216 of video frame 101 may be compared to a variety of macroblocks in subsequent video frames such as video frame 102, region 321 or frame 103, region 331. Potential macroblock matches may be macroblocks 320 or 330. The horizontal span of pixels in the search region may be referred to as horizontal search region range such as range 302, and the vertical span of pixels in the search region may be referred to as vertical search region range such as range 304.

Figure 4:
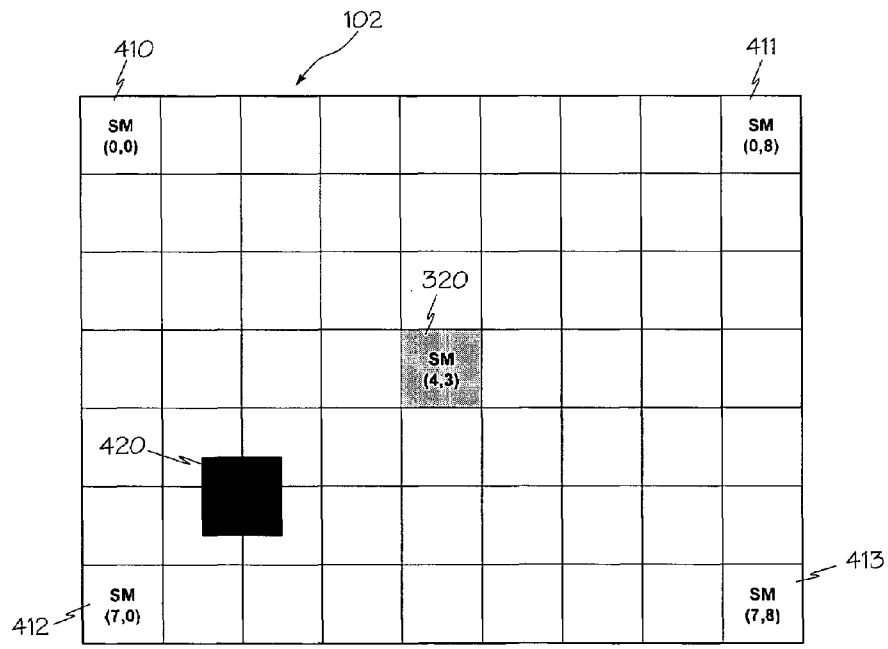
FIG. 4 is an example partitioning of a search region to 2-D grouping of pixels in macroblocks. This figure includes a candidate best motion vector match macroblock.

FIG. 4 illustrates search frame 102 organized as non-overlapping macroblocks such as macroblocks 410-413. Macroblock 320 depicts a motion vector candidate for FIG. 3, macroblock 216. The motion vector candidate may be designated as (0, 0). The macroblocks in a search frame are denoted as Search Macroblock (SM).

There are a variety of conventional ME search and match techniques. Example search techniques may be telescopic, diamond and exhaustive search. Example match techniques may be mean squared error and sum of absolute value of pixel wise differences (SAD). The ME process will be performed for many macroblocks in a video frame. For example, a SAD match operation requires comparing some or all pixels among a reference and search macroblock (256 pixel comparisons). In a search operation, many macroblock matches will be required. It can thus be appreciated that the computational capabilities required for ME are very significant for large size video images.

There are two characteristics of high performance ME and similar array DSP operations, data access and data processing capability. A first technique to provide efficient computational capabilities is to organize processing requirements to minimize the need for repeated data fetch while making available the data needed for parallel computation.

Figure 5:
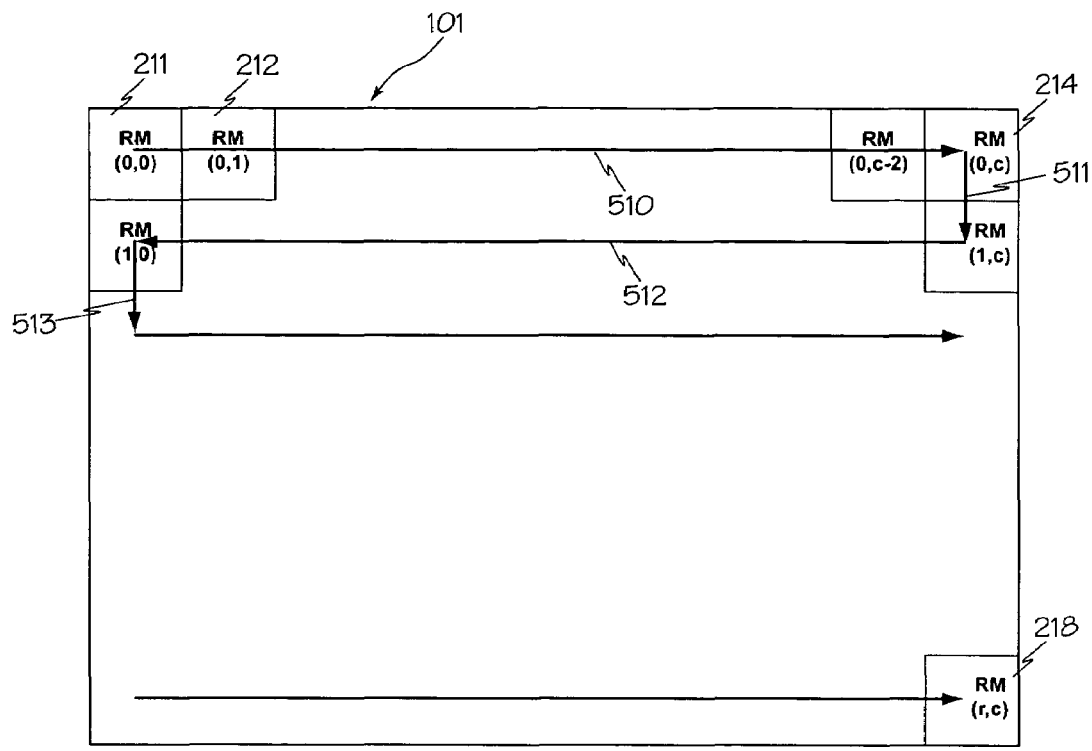
FIG. 5 is an example horizontal scanning pattern using non-overlapping macroblocks in a reference video frame.

FIG. 5 illustrates an example ordered processing of a video frame reference macroblocks according to the present disclosure. Reference macroblocks 211-215 are processed according to ordered scanning pattern 510-513. In another aspect, it may be suitable to process two or more macroblocks such as macroblocks 211, 212 and the macroblocks immediately below and adjacent the selected starting macroblocks in a computational step together with suitable modification to scanning order 510-513.

Figure 6:
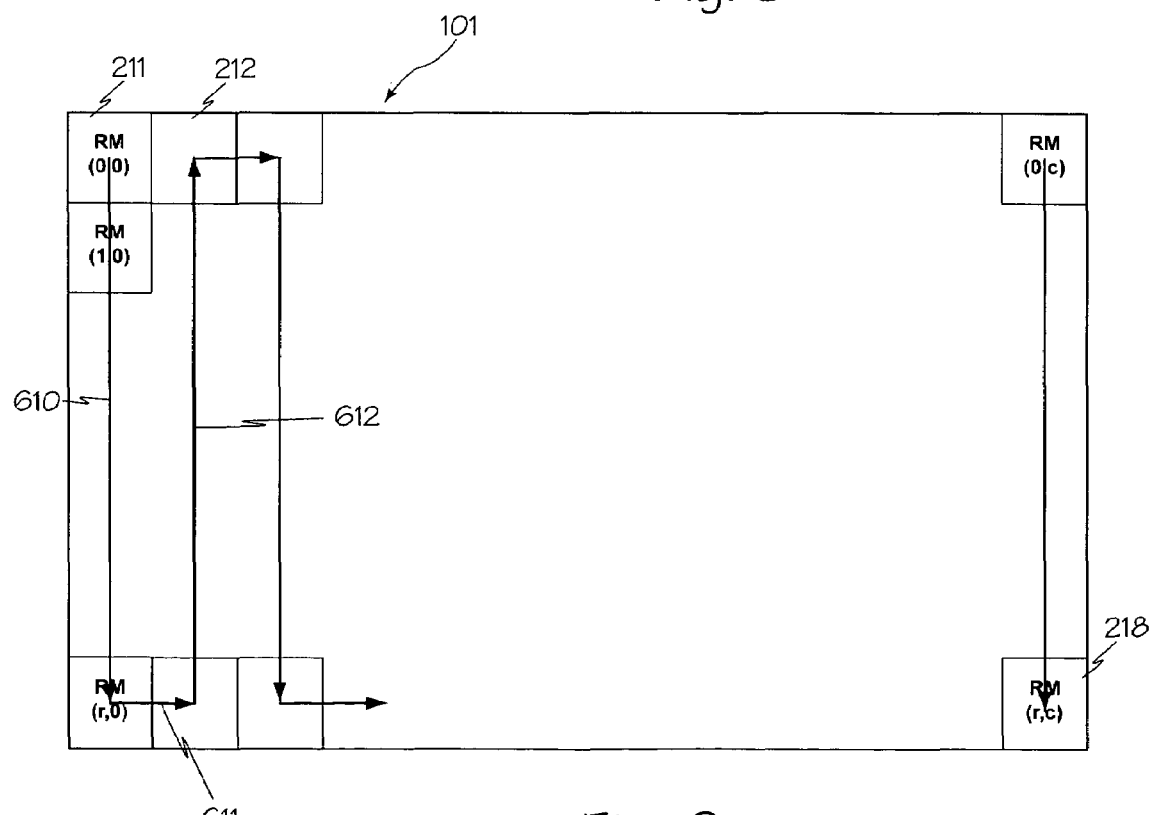
FIG. 6 is an example vertical scanning pattern using non-overlapping macroblocks in a reference vide frame.

FIG. 6 depicts an alternative scanning pattern 610-612 that similarly may result in efficient organization and operation. In general, a variety of scan ordered processing are possible. The benefits of scan ordered processing is the minimal need to repeatedly fetch frequently used data such as search frames while providing all required data for high-performance computation. New data element groups may include two or more data element types such as data columns or rows and may be used in subsequent iterations to expedite processing and optimize data reuse.

Figure 7:
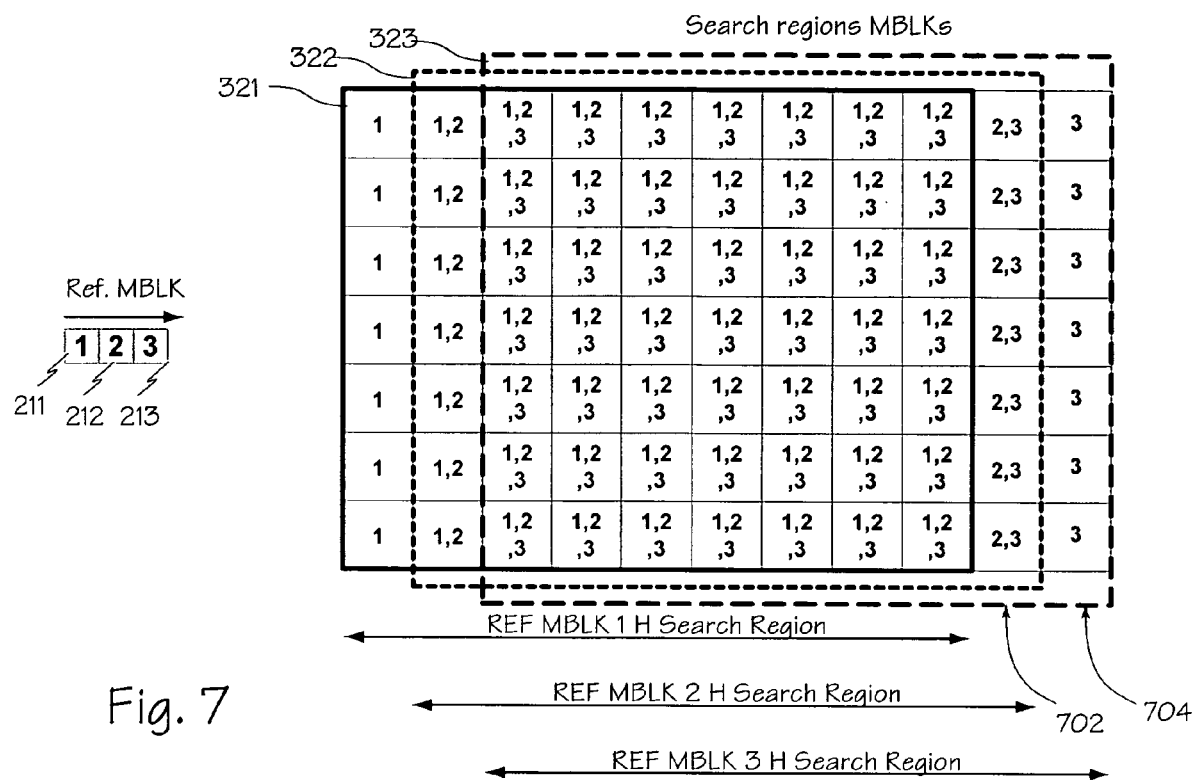
FIG. 7 is an example of overlapped search regions when consecutive reference video macroblocks are processed using left to right horizontal scanning pattern.

FIG. 7 depicts the search frame regions 321, 322 and 323 corresponding to macroblocks 211, 212, 213 respectively for left to right ordered scanned processing. The search region macroblocks are numbered 1-3 depending on their relevance and use for ME match by macroblocks 1-3. The present technique operates by storing and fetching required search macroblocks for a reference macroblock and then fetching new data element groups or search macroblock data columns such as macroblock column 702 and subsequently macroblock column 704 as the reference macroblock processing proceeds. To accommodate right to left processing, the process initially fetches a search region and sequentially provides macroblock columns to the left of the initial search macroblock.

Figure 8:
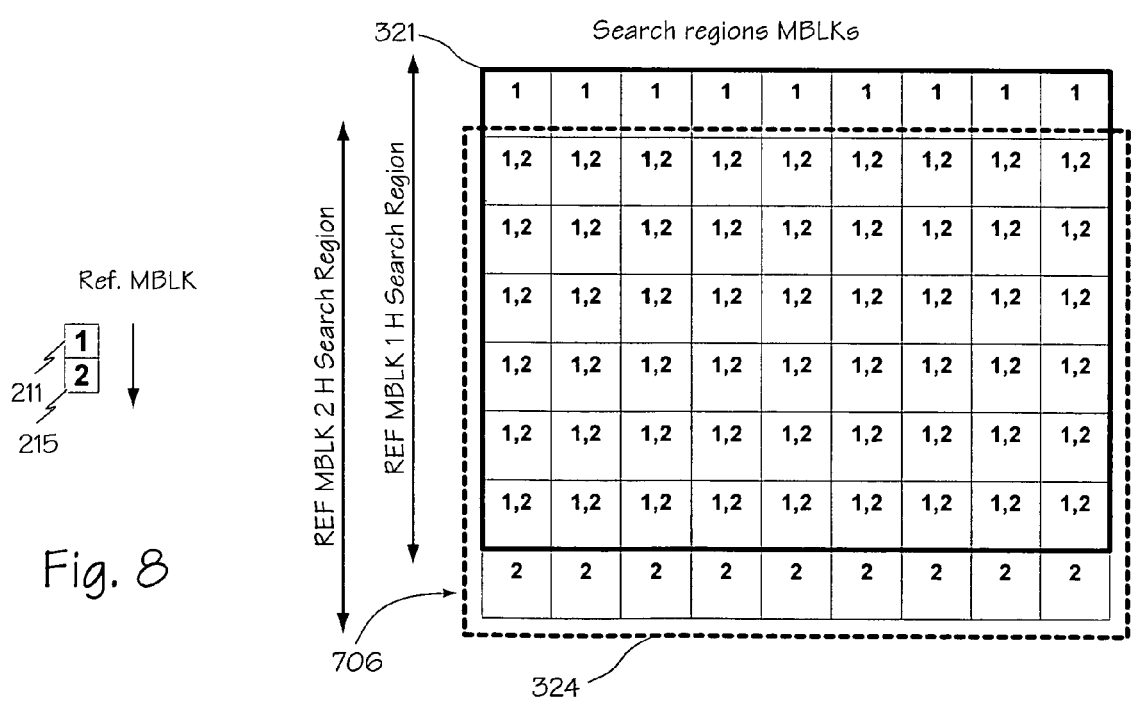
FIG. 8 is an example of overlapped search regions when consecutive reference video macroblocks are processed using top to bottom vertical scanning pattern.

FIG. 8 depicts search region macroblocks when reference block processing ordering is from top to bottom. The search region data for reference macroblock 211 is depicted as 321. The search region data for next sequential reference macroblock, macroblock 215, in a top to bottom ordered processing, is search region data 324. It can be appreciated that there is significant overlap and potential reuse of data between search regions if the described reference macroblock ordering is used.

Figure 9:
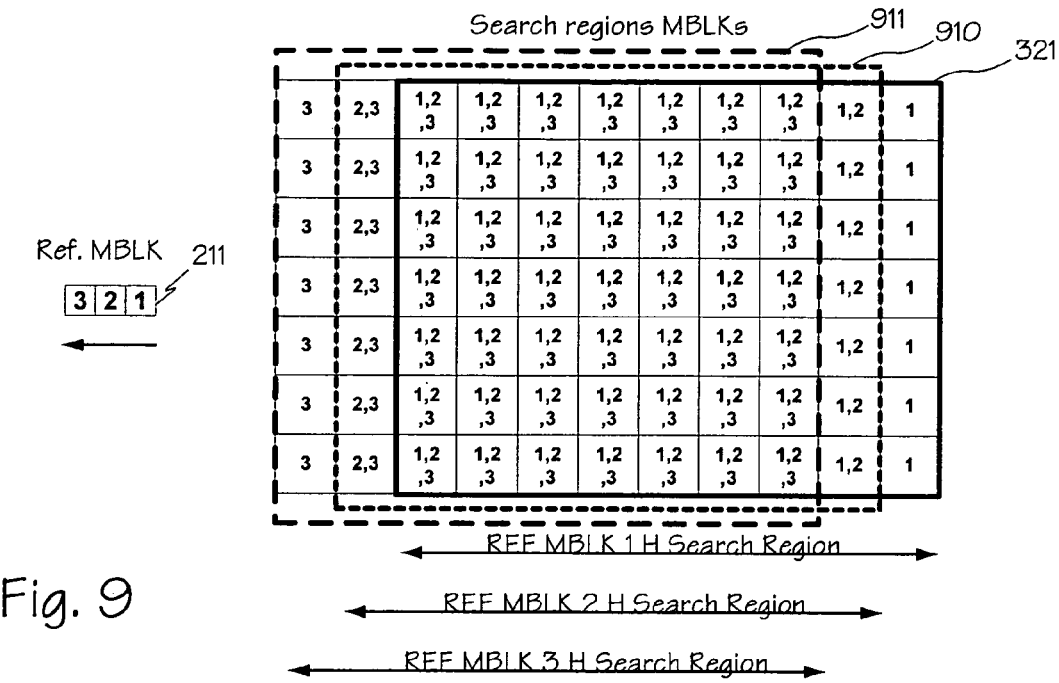
FIG. 9 is an example of overlapped search regions when consecutive reference video macroblocks are processed using right to left horizontal scanning pattern.

Similarly, FIG. 9 depicts search region 321, 910 and 911 used during motion estimation processing of reference macroblock 211 and ordered scan processing from right to left.

Figure 10:
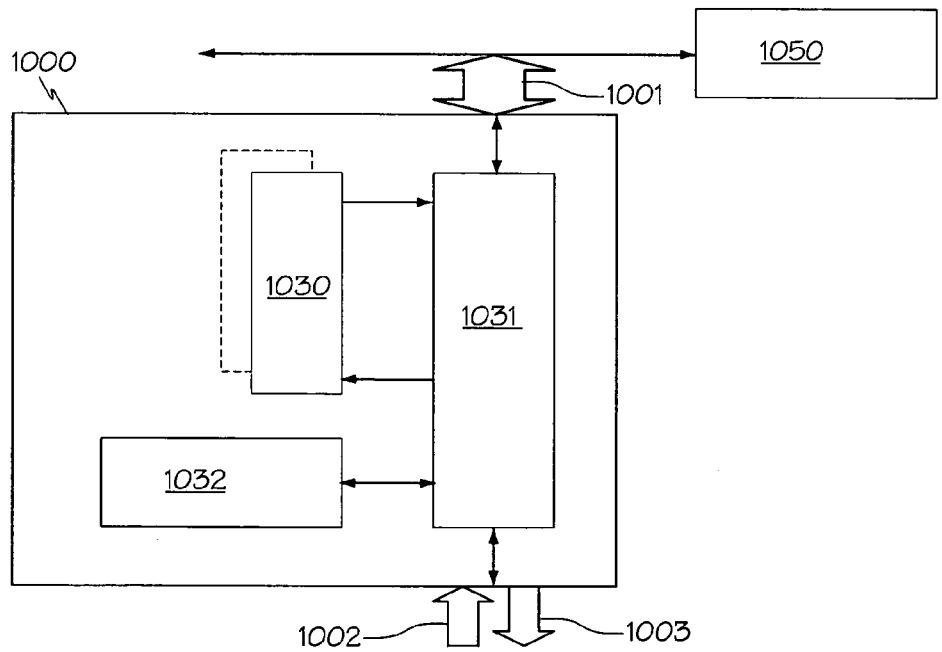
FIG. 10 is an example search frame memory storage element.

FIG. 10 a block diagram of storage and access unit 1000 to enable storage and access of search region data. Memory Unit 1000 is a basic building block memory element that may include of one or more memory elements such as semiconductor Static or Dynamic Random Access Memory (SRAM or DRAM) elements 1030 organized as m rows, of n bits each. Any suitable memory technology may be used. Control interconnect 1001 provides appropriate control, addressing and timing signals for proper operation of the memory element 1000. I/O interconnects 1002 and 1003 provide means to store or retrieve data to and from the internal memory unit 1030 and external devices. Optionally, there may be a Finite State Machine (FSM) 1032 used to decode control, generate addressing and data storage, retrieval, and timing facilities. Alternatively, a centralized unit such as central controller 1050 may provide this capability such as through control interconnect 1001. The logic unit 1031 may be used to provide necessary data transfer operations required for storage and retrieval of search region data.

Figure 11:
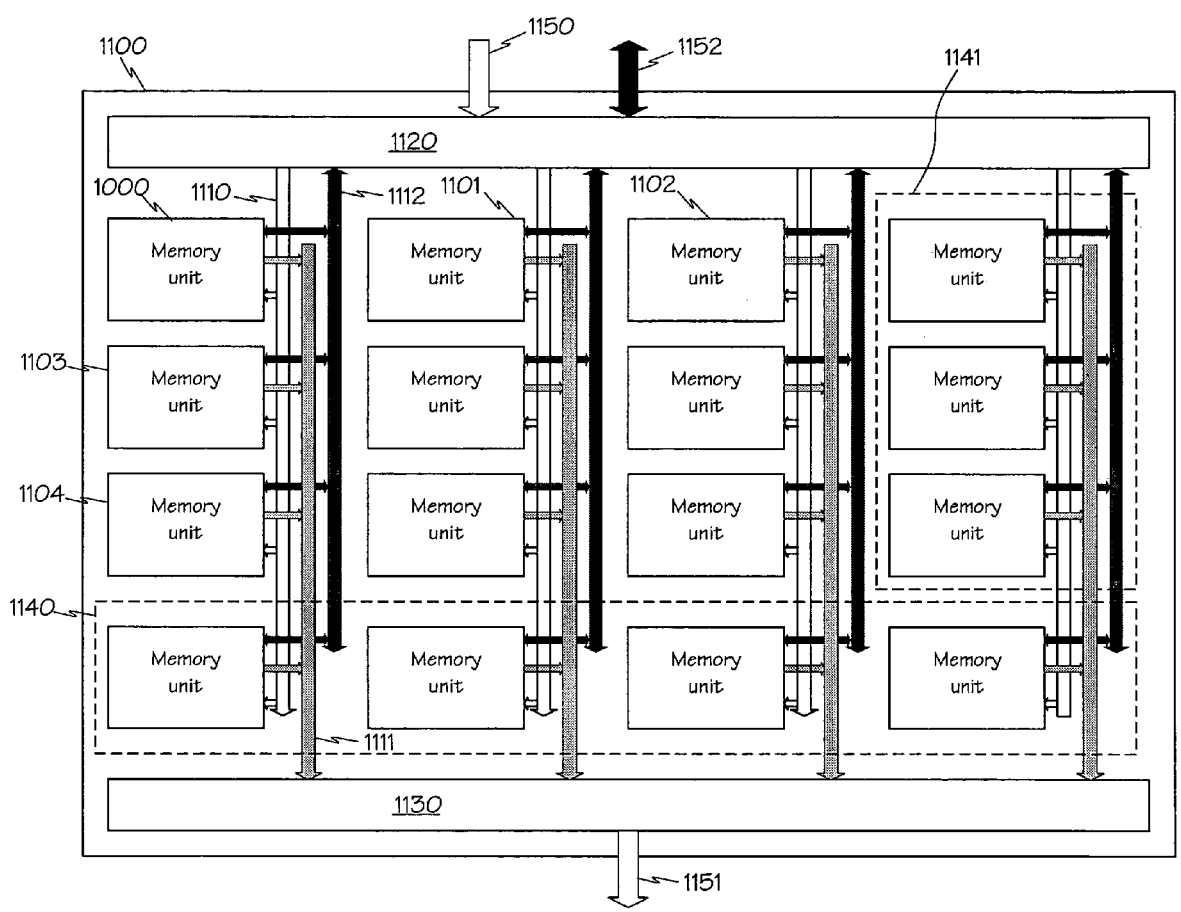
FIG. 11 is an example search memory region array organization.

Referring now to FIG. 11, two or more memory elements such as memory element 1000 may be organized as memory array unit 1100. Array unit 1100 can communicate with external devices via control interconnect 1152 and data storage and retrieval interconnects 1150 and 1151. Logic-processing element 1120 may provide control, decode, addressing, access and timing capabilities and signals for the proper operation of memory array unit 1100. This includes the ability to update and keep track of the correct starting point and ordering of stored and accessed search region memory data row and columns as the memory is updated. Multiple memory units such as memory units 1000 and 1101-1104 may be organized as a two-dimensional array. Logic unit 1130 provides mechanisms for multiplexing, access and potential data alignment during search region data retrieval. One or more additional memory unit subsets such as memory unit column 1141 and memory unit row 1140 may also be provided to facilitate the prefetch and preparation of new search region data according to the ordered scan processing. Another alternative configuration of the search region array is suitably addressing enhanced multi-way data caches found in many modern digital processing systems.

Figure 12:
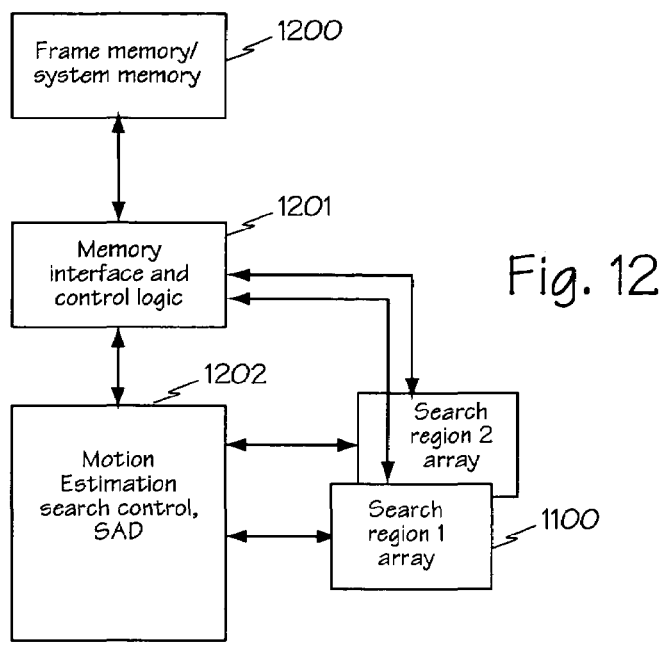
FIG. 12 is an example system that employs one or more search region arrays together with other compute, memory access and storage elements.

FIG. 12 is a block diagram of a hardware layout for the present technique. Unit 1200 is a mass data storage unit such as a DRAM used for storage and access of video image or other DSP data. Logic block 1201 provides the necessary control; timing, addressing and data transfer between the motion estimation processing element 1202 and frame/system memory unit 1200. One or more memory arrays such as memory array 1100 may be configured in parallel, series, or series-parallel and used for storage and retrieval of search region data.

Figure 13:
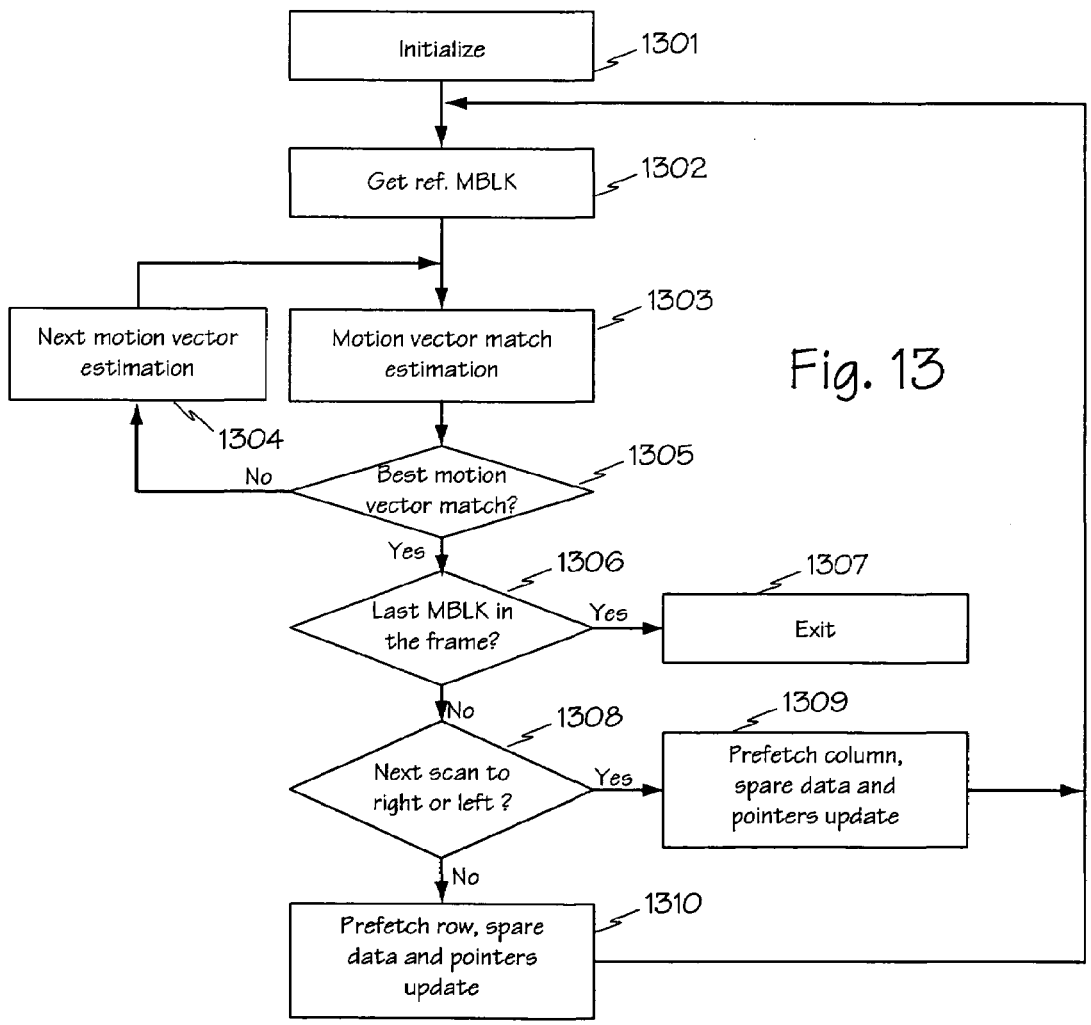
FIG. 13 is an example motion estimation search and match mechanism that uses search array and overlapped search mechanism.

FIG. 13 is an operational flow diagram of the present technique. After appropriate initialization operations 1301, a motion estimation process such as process 1302 may use one or more reference macroblocks. In processing steps 1303-1305, a determination is made as to whether candidate motion vector and associated macroblock matches are sufficient or whether additional search and macroblock match computation may be required. In step 1306, a check is made as to whether all macroblocks in a video image frame are processed, in which case the ME operation is complete (step 1307). Additional reference macroblocks will be processed per predetermined scan order in step 1308. If a determination is made that additional reference macroblocks along the scan order are feasible, the appropriate search region data required for the pending ME search region data will be pre-fetched into appropriate memory element column 1141 as in step 1309. If the next ordered scan macroblock processing is along vertical direction, the pending ME search region data will be pre-fetched into appropriate memory element row 1140 as in step 1310.

The processing steps 1306-1310 are depicted to be serially oriented for clarification. An alternative technique performs steps 1308, 1309 and 1308, 1310 overlapped in time with computational steps 1302-1306. The advantage of such a technique is to further reduce, hide the data memory pre-fetch through execution time overlap.

Figure 14:
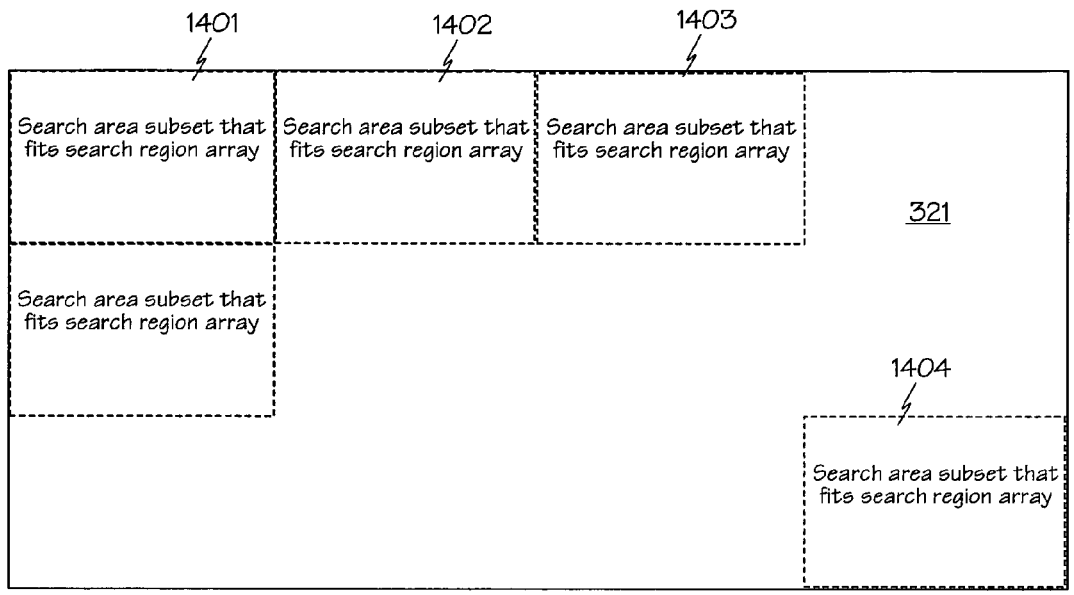
FIG. 14 is an example mechanism for finding optimum motion vector match in a larger search region using smaller search regions.

In many applications, parallel DSP operations on large data sets may be required. FIG. 14 depicts an example for motion estimation in a large search region. Based on design parameters such as power consumption, circuit design, IC die size and desired performance, an appropriate search region array, optimized for specific search range, item 1100 may be selected. Based on this determination, the system operation is optimized for operation on array data set such as item 1401. Operation on larger search region 321 can be accommodated by repeated application of the highly optimized system organization as in 1401-1404.

Many DSP applications require high-performance processing of many data elements in parallel. For example, in ME macroblock match, the sum of the absolute value of pixel wise difference (SAD) between a reference and search macroblock may be required. Recent video coding standards require SAD computations that depend on smaller size pixel groupings (e.g. 4×4 pixel groupings). This type of computation requires high-performance access and processing of data elements at various levels of granularity.

Figure 15A:
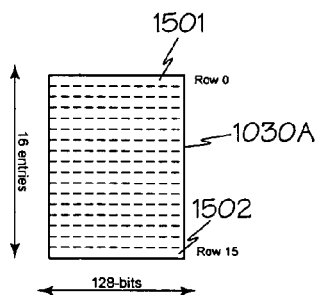
FIGS. 15A-15C illustrates several alternative internal storage and organization mechanisms for macroblock oriented data.
Figure 15B:
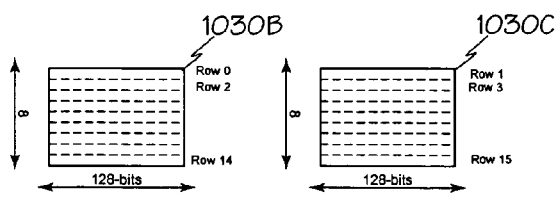
Figure 15C:
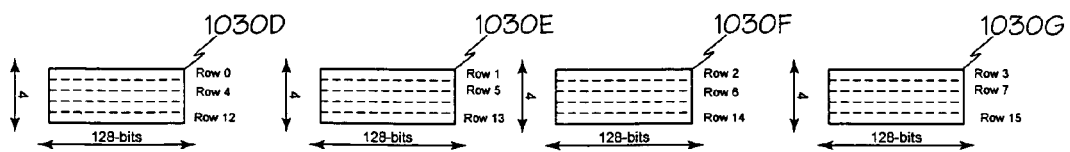

FIGS. 15A-15C depict several alternative internal data representations to satisfy the present technique. As in FIG. 15A for example, each memory element 1000 of FIGS. 10 and 11 may be organized as 16 rows (1501-1502), each row capable of storing data 16 pixels. For simplicity, assume that each pixel is represented as an 8-bit value corresponding to the luminance component of the video pixel. The ME macroblock match operation may consist of computation of SAD value on a 16 pixel row of data per array 1100 access. Organization of the memory element 1000 as in 1501 enables access to a 16-pixel data row such as data row 1030A per access.

Alternatively, as in FIG. 15B, the memory element 1000 may be organized as data rows 1030B and 1030C. Through appropriate modifications of units 1000, 1120, 1130, 1151 and 1152 a system such as illustrated in FIG. 12 may be constructed to allow higher SAD processing performance of two 16-pixel data rows per access. This will allow simultaneous computation of two macroblocks or execution of a single macroblock twice as fast, together with appropriate enhancements to the computational unit 1202.

The interleaved representation of data rows 1030D-1030G of FIG. 15C may similarly allow processing of four sets of 16 pixel data values per array 1000 access. This will allow simultaneous computation of four macroblocks or processing the same macroblock four times as fast, together with appropriate enhancements to the computational unit 1202. Thus, the memory element 1000 may be organized according to alternative interleaved representations of a macroblock as in FIGS. 15A-15C to allow scalable range of computational capabilities.

Figure 16:
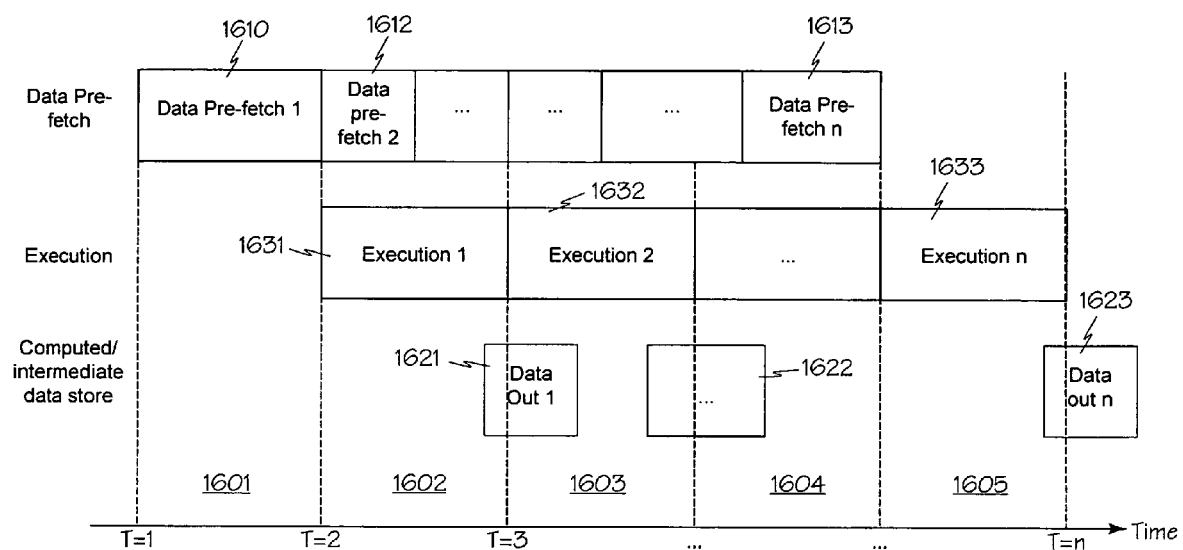
FIG. 16 is a timing chart illustrating the timing relationship between data input, execution and output.

FIG. 16 is a timing chart illustrating characteristics and considerations for matching of execution, data prefetch and computed, intermediate data store rate at regular time interval T=0 . . . n illustrated by time intervals 1601-1605 respectively. Data 1610 required for computation of appropriate results are pre-fetched during a suitable time interval such as interval 1601. The fetched data values will be used during execution step 1631 with final or intermediate results 1621 being stored during intervals or partial periods of intervals such as intervals 1602 and 1603. Similarly, time intervals 1602-1605 depict time intervals for pre-fetch of data 1611 and 1612 required for computational steps 2-n, execution steps 1632, 1633 and availability of the data for storage steps 1622 and 1623.

Optimum efficiency in scalable parallel processing of data may be approached when all data items required for execution during an interval are ready before execution may begin. When all required data are available prior to processing, the execution may continue without interruption or idle periods and at high-rate of performance. Thus, matching execution rate to data pre-fetch and output rate may achieve efficient system organization. In most designs, exact matching of the execution and data access rates at regular intervals is highly desirable but difficult to achieve.

A near optimal solution may be to allow such rate matching capability for sufficient number of consecutive time periods while ensuring that the required data is available prior to start of the execution in each time period. This may be accomplished through variety of hardware mechanisms such as interrupt, flags, etc. In software possible techniques may include semaphores, spin-lock loops, etc. The present DSP technique may utilize any such appropriate capabilities in hardware or software based on design tradeoff considerations.

Additionally, present DSP technique may include enhanced software instructions or other suitable implementations that allow a traditional programmable processor with hardware caches or the search region arrays such as memory array 1100 to efficiently accommodate the required data access and reuse capability. Suitable additional mechanisms may include:

To accommodate horizontal search range overlap reuse between consecutive reference macro blocks along a horizontal scan direction, a method to load new search frame data into a particular way of a given set in the cache or specific memory element column such as 1141 in search region array 1100 is needed. This may be accomplished through a new software instruction or other alternative implementations such as programmable Direct Memory Access (DMA) controller or finite state machine sequencer.

To accommodate vertical search range overlap reuse between consecutive reference macro blocks along a vertical scan direction, a method to load new search frame data into all ways of a particular set in the cache or specific memory element row such as 1140 in search region array 1100 is needed. This may be accomplished through a new software instruction or other alternative implementations such as programmable Direct Memory Access (DMA) controller or finite state machine sequencer.

The correspondence between reuse of data rows or columns based on the direction of movement of a scan order and the need for new search data may require a method to fill and replace particular ways of a set or particular sets within a way of a cache or data memory 1100. This may be accomplished through a new software instruction or other alternative implementations such as programmable Direct Memory Access (DMA) controller or finite state machine sequencer.

Since caches are usually used in conjunction with a memory management unit, the cache entries are typically physically addressed. Since many of the software programs operate in logical or virtual addressing modes, a mechanism to allow appropriate mapping of logical/virtual to physical address through the memory management unit for the desired search range memory representation may be needed. This may be accomplished through a software instruction or other suitable implementations.

Access of search memory region at macro block boundaries may not be aligned with the internal representation of memory element. For instance, parts of a 128-bit access may fall partially in one memory element while the rest are in the next sequential memory in the same row. While the presently disclosed technique addresses this issue via unit 1130, a similar mechanism may be needed for direct equivalence for operation in a cache memory. The equivalent cache functionality may be provided through a similar unit 1130 or through external special purpose instruction or circuitry that may perform the alignment.

While the examples cited have been detailed for motion estimation operation, it may be appreciated by one skilled in the art that similar high-performance capability can be constructed using structured scan ordering and processing of basic DSP computational routines. Other example DSP operations that benefit from the present technique may include direct and indirect Fast Fourier, Discrete Cosine Transform, 2-D, 3-D filtering and convolution, interlaced and non-interlaced video processing, 3-D graphics rendering, visibility ordering, display reconstruction and image recognition applications.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A technique for processing n-dimensional data comprising:
    determining a number of dimensions n for data to be processed;
    subdividing the data to be processed into elements;
    grouping data elements into a plurality of n-dimensional blocks;
    identifying a plurality of reference blocks from among the plurality of n-dimensional blocks;
    identifying a plurality of search regions, each one corresponding to one of reference blocks;
    loading data from a first one of the plurality of search regions corresponding to a first one of the plurality of reference blocks into a memory array;
    processing the data in the memory array with respect to the first one of the plurality of reference blocks;
    saving processing results associated with the first one of the plurality of reference blocks;
    loading data into the memory array from a portion of a second one of the plurality of search regions corresponding to a second one of the plurality of reference blocks, wherein the portion does not overlap with the first one of the plurality of search regions;
    processing the data in the memory array with respect to the second one of the plurality of reference blocks;
    saving the processing results associated with the second one of the plurality of reference blocks; and
    repeating the loading, processing and saving steps until each one of the plurality of reference blocks is processed.

2. The technique of claim 1 wherein the plurality of search regions are overlapping.

3. The technique of claim 1 wherein the plurality of search regions are non-overlapping.

4. The technique of claim 1 wherein the loading, processing and saving steps are performed in parallel.

5. The technique of claim 1 wherein the loading, processing and saving steps are overlapped in time.

6. The technique of claim 1, wherein the step of loading data into the memory array from the portion of the second one of the plurality of search regions further comprises:
    releasing a portion of data in the memory array that is not required for processing the second one of the plurality of reference blocks.

* * * * *